C. WAGNER.
BUTTER TESTER.
APPLICATION FILED MAY 19, 1909.
955,725.
Patented Apr. 19, 1910.
2 SHEETS—SHEET 1.
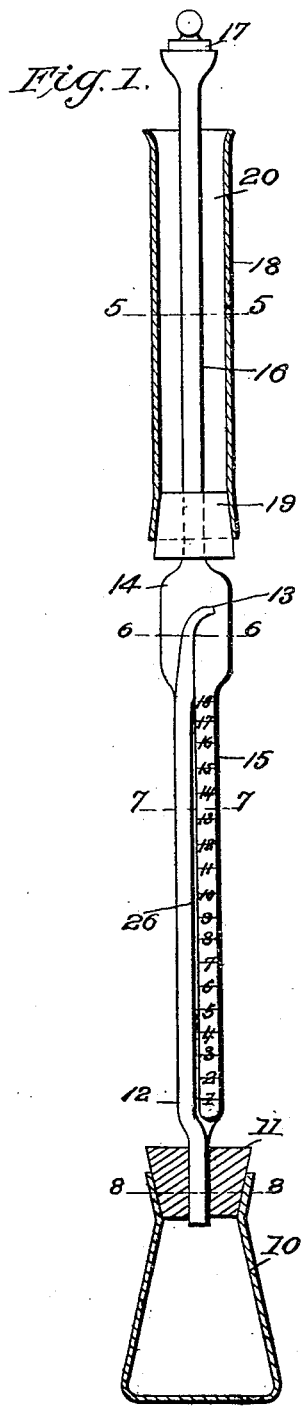
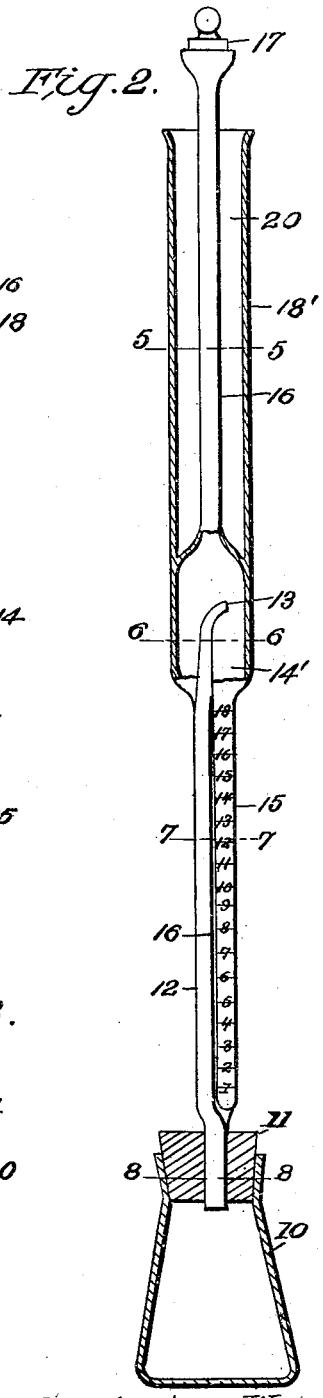
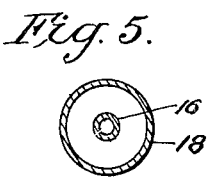
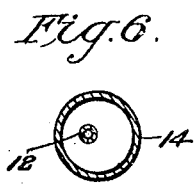
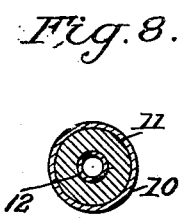
Witnesses
J. M. Fowler Jr.
S. L. Richmond
Inventor
Constantin Wagner
By Mason Fenwick & Lawrence
Attorneys

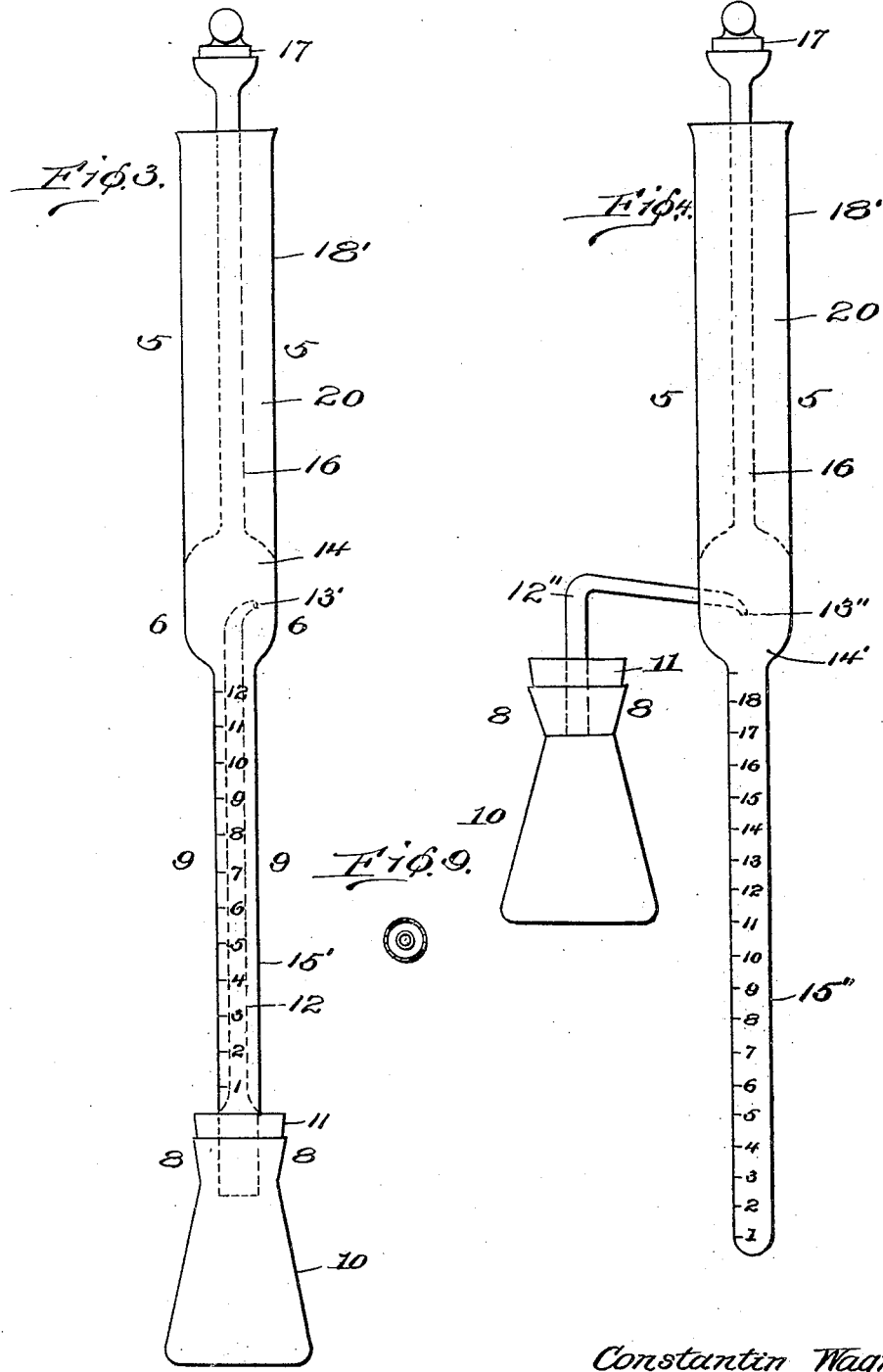

UNITED STATES PATENT OFFICE.

CONSTANTIN WAGNER, OF NEW YORK, N. Y.

BUTTER-TESTER.

955,725.  Specification of Letters Patent.  Patented Apr. 19, 1910.

Application filed May 19, 1909. Serial No. 497,084.

*To all whom it may concern:*

Be it known that I, CONSTANTIN WAGNER, a citizen of the United States, residing at New York, in the county of New York and State of New York, have invented certain new and useful Improvements in Butter-Testers; and I do hereby declare the following to be a full, clear, and exact description of the invention, such as will enable others skilled in the art to which it appertains to make and use the same.

This invention relates to an apparatus for testing the percentage of water in butter, and for similar purposes, and has for an object to provide a device more easily, quickly and accurately operated than the several devices ordinarily employed.

A further object of the invention is to provide in a device of this class a simple structure by the employment of which the water content of the butter may be read directly from the graduate without reversing or otherwise changing the position of the tester.

A further object of the invention is to provide in a tester of this class, means whereby the water content is collected in the graduate as rapidly as distilled from the butter.

With these and other objects in view, the invention comprises certain other novel constructions, combinations and arrangements of parts, as will be hereinafter fully described and claimed.

In the drawings:—Figure 1 is a view of the device in side elevation partially broken away to more clearly show the construction. Fig. 2 is a view of the device in slightly modified form. Fig. 3 is a still further modification of the invention. Fig. 4 shows an embodiment of the invention wherein the butter containing flask is disposed at the side of the graduated tube. Fig. 5 is a transverse, sectional view taken on line 5—5 of Figs. 1, 2, 3 and 4. Fig. 6 is a transverse, sectional view taken on line 6—6 of Figs. 1, 2 and 3. Fig. 7 is a transverse, sectional view taken on line 7—7 of Figs. 1 and 2. Fig. 8 is a transverse, sectional view taken on line 8—8 of Figs. 1, 2, 3 and 4. Fig. 9 is a transverse, sectional view taken on line 9—9 of Fig. 3.

Like characters of reference designate corresponding parts throughout the several views.

The device forming the subject-matter of this invention is identical with the device described in applicant's former application Serial Number 360,173, filed March 2, 1907, and embodies a flask 10 of the usual and ordinary form, and construction, which is provided with a stopper 11 perforated centrally to receive a tube 12, 12′ or 12″. The tube 12 extends upwardly from the stopper 11 and has a curved nozzle 13 which is inserted within a trap bulb 14, 14′ or 14″. The tube 12 is preferably constructed integral with the bulb 11 and from the lower side of the bulb 14 depends a graduate tube 15 which may extend longitudinally along the tube 12, as shown in Figs. 1 and 2, and preferably connected therewith by an integral web 26 or may surround the tube 12′ as shown at 15′ in Fig. 3, or may be entirely removed from association with the tube as shown in Fig. 4. As shown in Fig. 4, the tube 12″ is bent so that the portion of the tube entering the bulb 14 has a somewhat downward position and enters the side of the bulb 14. Above the bulb 14 is a condensing tube 16 in communication with the bulb and may, if desired, be closed at the upper end by a stopper 17. Surrounding the condensing tube 16 is a jacket 18 as shown in Fig. 1, associated with the condensing tube by means of engagement upon a perforated stopper 19 or as shown in Figs. 2, 3 and 4, formed integral with the bulb 14. Between the tube 16 and the jacket 18 or 18′ is defined a chamber 20 for the receipt of a cooling element such as water, cracked ice, or the like, by which means the condensing tube 16 is kept constantly cool.

The various embodiments of the invention shown in the several Figs. 1, 2, 3 and 4 employ the same construction broadly, and the same method of operation, to wit, a discharge tube associated with the flask, the discharge tube leading to a trap bulb and with a graduate tube depending from the bulb.

In operation a predetermined quantity of butter is placed in the flask 10, together with the predetermined quantity of some light oil which boiling point is higher than the boiling point of water, such as petroleum, or like oils, and after melting the butter and mixing with the oil reagent the flask is submitted to a higher degree of heat, as in a flame, to cause boiling of the butter contained in the flask. The water contained in the butter together with the oil reagent is distilled over through the tube 12 and discharged from the nozzle 13 in the bulb 14, 14′ or 14″. A portion of the vaporized water and reagent will be condensed within the bulb 14 and the remaining portion will rise to the condensing tube 16, and therein being brought in contact with the cooling element will be condensed and will run down the sides of the cooling tube 16 and bulb 14, 14′ or 14″ into the graduate tube 15, 15′ or 15″.

It is well known that when condensed the water and the oil reagent separate by their own gravity, and as soon as the bubbling ceases in the flask the water content of the butter may be read directly from the graduate 15, 15′ or 15″ without any necessary movement, agitation or inverting of the devices.

One of the greatest advantages obtained by the employment of the present invention is the celerity with which tests may be made, as it is not necessary to even remove the distillate or residuum from the apparatus after each test. When one test is made and a record made of the reading of the graduate more butter and oil reagent may be introduced into the flask and heated as above described, and the amount of water appearing in the graduate after the second test, minus the quantity of water shown in the first test, will be the quantity of water contained in the second sample of butter tested.

While the device herein shown and described is especially and particularly adapted for use in the testing of butter it is to be understood that it may be employed for testing various other articles.

What I claim is:—

1. In a device of the class described, a flask, a discharge tube mounted in the flask, a bulb superimposed upon the discharge tube, a condensing tube superimposed upon the bulb, a cooling chamber surrounding the condensing tube, and a graduate tube depending from the bulb.

2. In a device of the class described, a flask, a discharge tube mounted in the flask, a bulb mounted above the flask and adapted to receive the mouth of the discharge tube, a condensing tube superimposed upon the bulb, a cooling chamber surrounding the condensing tube, and a graduate tube paralleling the discharge tube.

3. In a device of the class described, a flask, a discharge tube connected with the flask, a bulb adapted to receive a discharge from the discharge tube, a condensing tube positioned upon the bulb, a cooling chamber surrounding the condensing tube, and a graduate tube surrounding the discharge tube.

In testimony whereof I affix my signature in presence of two witnesses.

CONSTANTIN WAGNER.

Witnesses:
MARY PERRY,
HUGO MOCK.